United States Patent [19]

Anzai et al.

[11] Patent Number: 5,469,947
[45] Date of Patent: Nov. 28, 1995

[54] FLUID CLUTCH DEVICE

[75] Inventors: Hidenobu Anzai, Iwaki; Moritaka Gotoh, Chiba; Youichi Hisada, Iwaki, all of Japan

[73] Assignee: Fujikura Ltd., Tokyo, Japan

[21] Appl. No.: 112,323

[22] Filed: Aug. 27, 1993

[30] Foreign Application Priority Data

Sep. 20, 1992 [JP] Japan ................... 4-258651
Sep. 28, 1992 [JP] Japan ................... 4-258650

[51] Int. Cl.⁶ ............................... F16D 27/00
[52] U.S. Cl. ......................... 192/21.5; 62/133
[58] Field of Search ............... 192/21.5; 62/133

[56] References Cited

U.S. PATENT DOCUMENTS

| | | |
|---|---|---|
| 2,886,151 | 5/1959 | Winslow . |
| 3,047,507 | 7/1962 | Winslow . |
| 4,325,225 | 4/1982 | Price, II . |
| 4,510,764 | 4/1985 | Suzuki . |
| 4,867,287 | 9/1989 | Hayashi ............... 192/21.5 X |
| 4,880,216 | 11/1989 | Hartel et al. . |
| 4,898,266 | 2/1990 | Garrett et al. . |
| 4,898,267 | 2/1990 | Garrett et al. . |
| 4,920,929 | 5/1990 | Bishop ............... 192/21.5 X |
| 5,007,303 | 4/1991 | Okuzumi ............. 192/21.5 X |
| 5,094,328 | 3/1992 | Palmer ............... 192/21.5 X |

FOREIGN PATENT DOCUMENTS

| | | |
|---|---|---|
| 0317186 | 5/1989 | European Pat. Off. . |
| 0335086 | 10/1989 | European Pat. Off. . |
| 0356145 | 2/1990 | European Pat. Off. . |
| 0395007 | 10/1990 | European Pat. Off. . |
| 3205017 | 8/1983 | Germany . |
| 1-250626 | 10/1989 | Japan . |
| 2122150 | 1/1984 | United Kingdom . |
| 2169374 | 7/1986 | United Kingdom . |

OTHER PUBLICATIONS

Patent Abstracts of Japan, vol. 2, No. 83 (M–026), Jul. 6, 1978, JP-A-53 051 834, Nov. 5, 1978.

*Primary Examiner*—Andrea L. Pitts
*Attorney, Agent, or Firm*—Oblon, Spivak, McClelland, Maier, & Neustadt

[57] ABSTRACT

There is disclosed a fluid clutch device for controlling transmission of motive power of a vehicular engine to accessory equipment such as an oil pump for a power steering mechanism or an air compressor for an air conditioner. The clutch device includes first and second members arranged for relative rotation about a common axis. The first member is operated by the vehicular engine while the second member is constructed to operate the accessory equipment. The first and second members are accommodated in a hermetically sealed clutch casing which is filled with an electroviscous fluid. A source of high voltage potential is provided for applying a voltage to the electroviscous fluid, and various units for generating information regarding driving of the accessory equipment are also used. A clutch control unit is electrically connected to the source of high voltage potential and the information-generating units, and regulates the voltage applied to the electroviscous fluid based on the information generated from the information-generating units to vary a driving power for operating the accessory equipment.

13 Claims, 6 Drawing Sheets

FLUID CLUTCH DEVICE

BACKGROUND ART

The present invention relates to a fluid clutch device for controlling the transmission of motive power of a vehicular engine to accessory equipment.

An example of accessory equipment driven with the engine power is an oil pump for power steering. The oil pump is belt-driven directly from the engine so that, as the engine speed increases, the pumped volume increases. The excess volume beyond a certain flow volume is discharged through a relief valve to a reservoir. Another example of the accessory equipment to be driven with the use of the engine power is a compressor for air conditioning. Conventionally, the power to the compressor is transmitted via a magnetic clutch which is activated or deactivated electrically to transmit or disconnect the engine power to or from the compressor.

Thus, in the oil pump, since the excess volume of oil is discharged through the relief valve, the engine power used to pump the excess volume is wasted. In addition, in the case of the compressor, the compressor action continues on the coolant with the revolution action of the engine, irrespective of the need for cooling, and generates needless action of the compressor particularly at high rotational speeds of the engine, resulting in waste of the engine power.

Furthermore, when the conventional magnetic clutch is activated or deactivated, a clutch armature is suddenly connected to or disconnected from a clutch pulley, so that a large noise is generated. In addition, since the accessory equipment is abruptly driven or stopped, vehicle passengers are subjected to irritating jolt upon activation or deactivation of the clutch. Furthermore, when the magnetic clutch is activated during the acceleration stage of the vehicle, the acceleration becomes blunted and the fuel consumption increases since the motive power of the engine is partly used to operate the accessory equipment.

SUMMARY OF THE INVENTION

It is therefore a primary object of the present invention to provide a novel fluid clutch device which can transmit a desired degree of a motive power of a vehicular engine to accessory equipment in a desired manner.

Another object of the invention is to provide a fluid clutch device which transmits only the needed power to operate accessory equipment so as to conserve the motive power of the engine.

Yet another object of the invention is to provide a fluid clutch device which lessens noise generated by the accessory equipment, and shock loading on the accessory equipment when activating or deactivating the accessory equipment so as to provide a quiet and smooth ride for vehicle passengers.

A further object of the invention is to provide a fluid clutch device which permits excellent acceleration of the vehicle while conserving the fuel consumption.

According to the primary aspect of the present invention, there is provided a fluid clutch device for controlling transmission of motive power of a vehicular engine to accessory equipment, the clutch device comprising:

(a) first and second members arranged for relative rotation about a common axis, the first member being constructed to be operated by the vehicular engine while the second member is constructed to operate the accessory equipment;

(b) a hermetically sealed clutch casing for accommodating the first and second members therein, the clutch casing containing an electroviscous fluid therein;

(c) a source of high voltage potential provided for applying a voltage to the electroviscous fluid to change viscosity of the electroviscous fluid to vary coupling force between said first and second members;

(d) means for generating a signal regarding driving of the accessory equipment; and (e) a clutch control unit electrically connected to the source of high voltage potential and the accessory signal-generating means for regulating the voltage applied to the electroviscous fluid based on the accessory signal generated from the accessory signal-generating means to vary a driving power to be transmitted to the accessory equipment.

In the above fluid clutch device, the voltage applied to the electroviscous fluid is regulated based on the signal regarding the driving of the accessory equipment, and the driving power for operating the accessory equipment is controlled. Therefore, it becomes possible to transmit a desired degree of the motive power of the vehicular engine to the accessory equipment in a desired manner.

In another aspect of the invention, it is preferable that the clutch control unit be constructed so that the viscosity of the electroviscous fluid is controlled so as to transmit only the necessary degree of turning force required by the accessory equipment. With this construction, regardless of the rotational speed of the engine, only the required magnitude of force is transmitted to the accessory equipment, and the motive power of the engine is conserved for the vehicle.

In yet another aspect of the present invention, the control unit may be constructed to increase or decrease the voltage to be applied to the electroviscous fluid gradually so as to activate or deactivate the accessory equipment slowly at the time of activating or deactivating the accessory equipment. With this modification, after the accessory equipment is turned on, the voltage on the fluid is increased gradually so as to transmit the force for driving the accessory slowly. After the accessory equipment is turned off, the voltage applied to the electroviscous fluid is decreased gradually so as to decrease the force transmitted to the accessory equipment slowly. Therefore, the generation of noise and shock loading on the engine caused by a sudden application of force on the accessory equipment are lessened.

In a further aspect of the present invention, the control unit may be constructed so that, when the vehicle is in the acceleration stage, the degree of coupling between the first and second members is lowered. In this modification, when the vehicle is in the acceleration stage, the control voltage is applied to the electroviscous fluid so as to lower the degree of coupling between the first and second members. By so doing, the driving power used to drive the accessory equipment is lowered, thus conserving the motive power of the engine for the vehicle. Therefore, the acceleration capacity is maintained and the fuel consumption is conserved.

Furthermore, the control unit may be constructed so that, when the vehicle is in the deceleration stage, the control voltage applied to the electroviscous fluid is regulated so as to increase the degree of coupling between the first and second members. By so doing, part of the motive power of the engine is transmitted to drive the accessory equipment, thus effectively utilizing the motive power of the engine and the motion energy of the vehicle, and conserving the fuel consumption.

DESCRIPTION OF PREFERRED EMBODIMENTS OF THE INVENTION

The fluid clutch device of the present invention will now be explained with reference to the accompanying drawings. FIGS. 1 to 9 depict a fluid clutch device in accordance with a first embodiment of the invention, which is used to control the transmission of motive power of a vehicular engine to a compressor of an air conditioner (referred to as the compressor hereinbelow).

Figure 1:
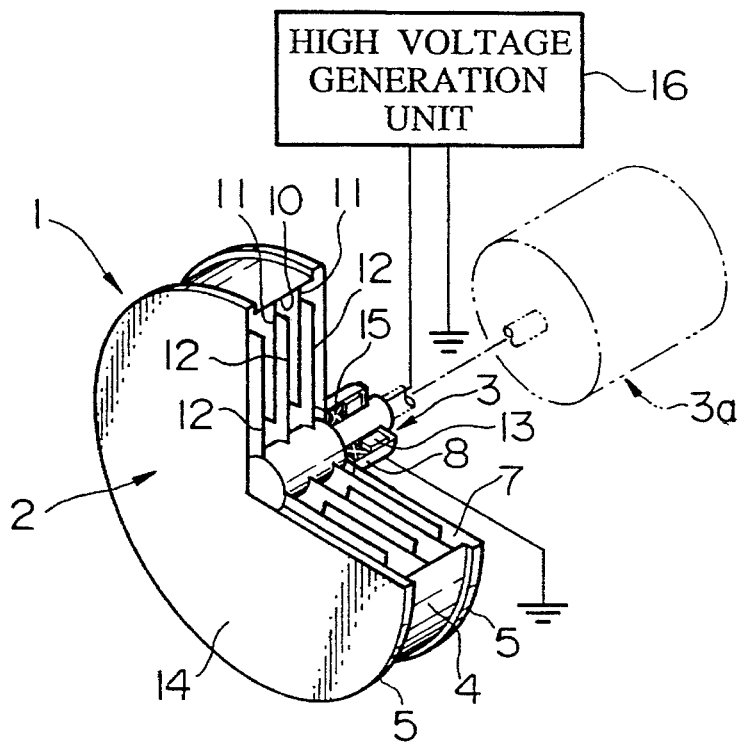
FIG. 1 is a partially cut-away perspective view of a fluid clutch device in accordance with a first embodiment of the present invention.
Figure 2:
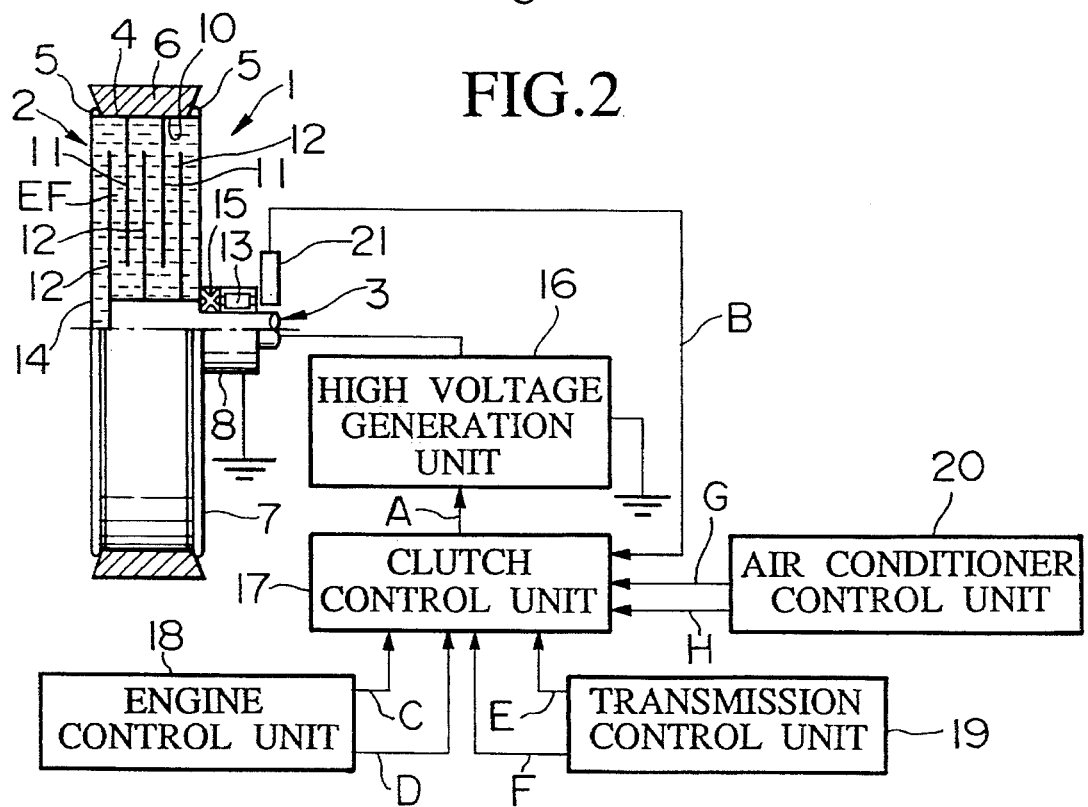
FIG. 2 is a schematic diagram showing the operating components of the fluid clutch device of FIG. 1.

Referring to FIGS. 1 and 2, the fluid clutch device comprises a clutch 1 which includes a hermetically sealed clutch casing 2 of a cylindrical shape having an axis of rotation and made of a suitable electrically conductive material and an output shaft 3 of an electrically conductive material disposed in the clutch casing 2 for relative rotation about a common axis. The clutch casing includes a cylindrical shell portion 4 and a pair of end plates 7 and 14 disposed at opposite ends of the shell portion. The cylindrical shell portion 4 has a pair of circumferentially extending protrusions 5 formed on opposite ends thereof so as to protrude radially outwardly thereof, and a transmission belt 6 is wound on to that portion of the cylindrical shell portion 4 confined by the protrusions 5, whereby the motive power generated by a crank shaft of a vehicular engine (not shown) is transmitted to the clutch casing 2. In addition, a cylindrical section 8 of a smaller diameter than that of the cylindrical shell portion 4 is provided on the one end plate 7 so as to protrude coaxially therefrom.

The output shaft 3 is rotatably supported by a bearing assembly 13 accommodated in the cylindrical section 8, and disposed so that the one end extends outwards through the cylindrical section 8 and fixed to a drive shaft of a compressor 3a whereas the other end is located inside the clutch casing 2 with a prescribed spacing being formed from the end plate 7 of the casing 2. A plurality of disc-shaped outer plates 11 of a suitable electrically conductive material having holes are securely fixed to an inner peripheral surface 10 of the clutch casing 2. In FIGS. 1 and 2, two such disc-shaped plates are shown. Thus, an assembly of the fixed outer plates 11 provided on the clutch casing 2 constitutes a driving member (first member) which is adapted to be rotated by the rotating engine.

Furthermore, a plurality of disc-shaped inner plates 12 of an electrically conductive material having holes (three in FIG. 1) are securely fixed to that portion of the outer peripheral surface of the output shaft 3 located within the casing 2. The diameter of the inner plates 12 is smaller than that of the inner peripheral surface 10 of the casing 2 by a prescribed amount. An assembly of the inner plates 12, which are securely fixed to the output shaft 3, constitutes a driven member (second member) for rotating the compressor 3a (accessory equipment). The inner plates 12 are disposed alternately with the outer plates 11 with a prescribed fixed spacing so as to enable the plates 11 and 12 to rotate relative to each other while their axial movement is restrained. In addition, an oil seal 15, for sealing the space between the clutch casing 2 and the output shaft 3, is accommodated in the cylindrical section 8 so as to be located at a position displaced axially inwardly from the bearing assembly 13. Furthermore, the clutch casing 2 and the output shaft 3 are electrically isolated from each other with a suitable electrical insulation material interposed therebetween.

The clutch casing 2 with the seal 15 is filled with an electroviscous fluid (electro-rheological fluid) EF whose viscosity changes with the applied voltage. The viscosity change of the fluid changes the shear resistance exerted on the outer and inner plates 11 and 12, thus changing the degree of transmission of torque from the driving side of the clutch casing 2 to the output shaft 3, i.e. the degree of coupling between the driving member and the driven member. The applicable electro-viscous fluid is disclosed, for example, in U.S. Pat. Nos. 2,886,151 and 3,047,507. An example of such a fluid is a mixture containing 40–60 weight % of silicic acid, 30–50 weight % of an organic phase of low boiling point, 10–50 weight % of water and 5 weight % of a dispersion medium, for example, isododecane.

The output shaft 3 is electrically connected to one end of a high voltage generation unit 16 or a source of high voltage potential, such as a DC-DC converter whose one end is grounded to the vehicle (not shown) supplying the motive power. The clutch casing 2 is also grounded. This arrangement enables the high voltage generation unit 16 to apply a control voltage on the electroviscous fluid existing between the outer plates 11 and the inner plates 12.

The high voltage generation device (shortened to generator) 16 is electrically connected to a clutch control unit 17 which generates a control signal A to control the applied voltage generated by the generator 16. A known engine control unit 18 for controlling the engine action, a known air conditioner control unit 20, a known transmission control unit 19 for controlling the operation of the transmission, and a rotameter 21 for detection of the rotational speed of the output shaft 3, i.e., the compressor 3a, are connected to the clutch control unit 17.

The rotameter 21 is disposed adjacent to the part of the output shaft 3 extending out of the casing 2, in such a way to determine the rotational speed, for example, by counting the peaks of circumferentially equally spaced grooves formed on the outer periphery of the output shaft 3, and outputting a pulsed signal B in accordance with the rotational speed of the output shaft 3.

The engine control unit 18 is constructed to output a signal C to indicate the engine speed, and a signal D to indicate the degree of opening of a throttle valve assembly. The signals C, D may also be inputted to the clutch control unit 17 directly from a known engine speed transducer and a known throttle valve position transducer, respectively.

The transmission control unit 19 is constructed to generate signals E to indicate the position of the variable speed gear, and a signal F to indicate the vehicle speed. In the case of a manual transmission, a gear-position sensing transducer can be utilized, and the gear-position signal can be inputted together with the vehicle speed signal into the clutch control unit 17.

The air conditioner control unit 20 is constructed to generate a signal G indicating the on/off requirement for the compressor 3a, and a signal H indicating the volume of coolant required.

Figure 3:
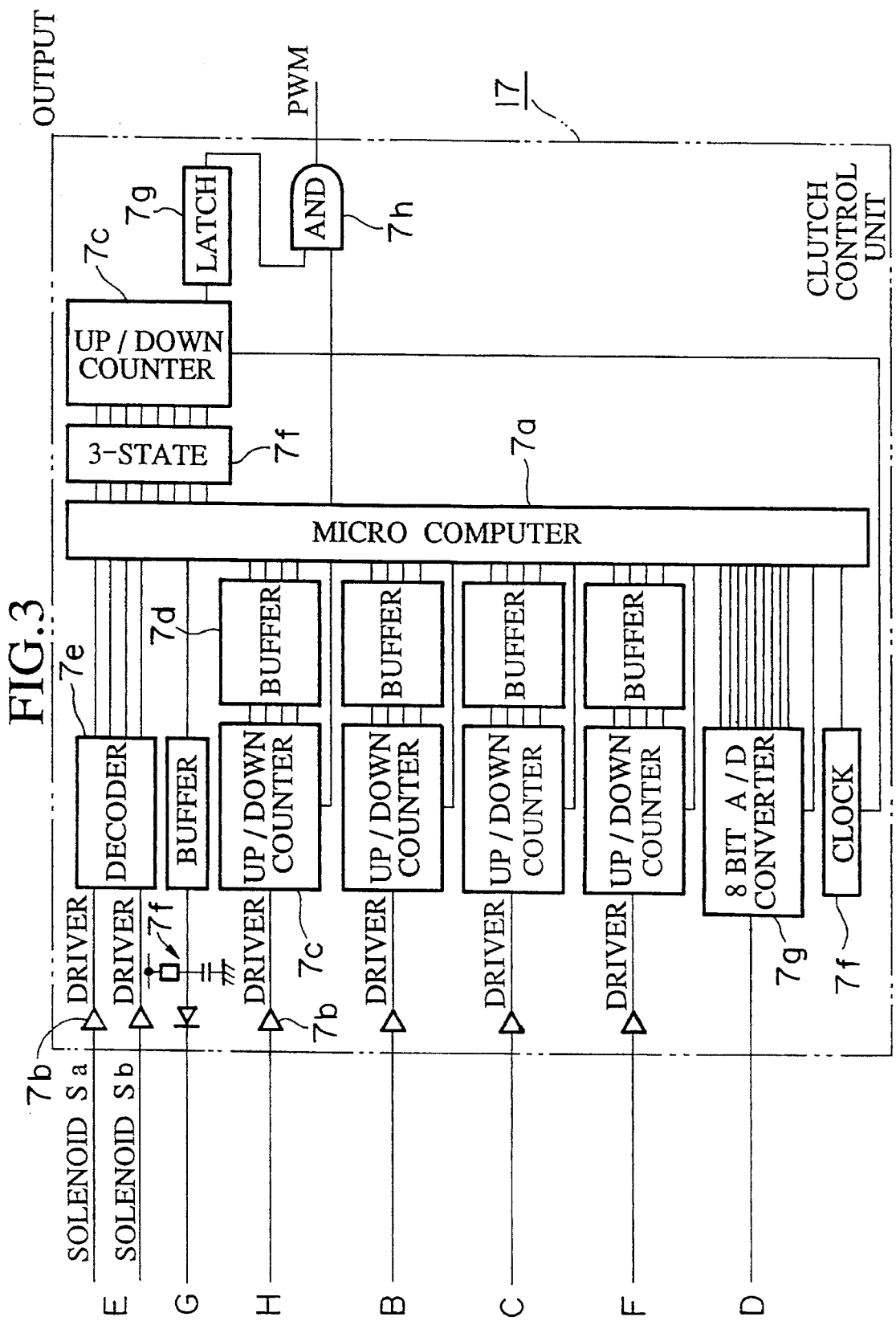
FIG. 3 is a view showing an electric circuit of a control unit of the fluid clutch device of FIG. 1.
Figure 4:
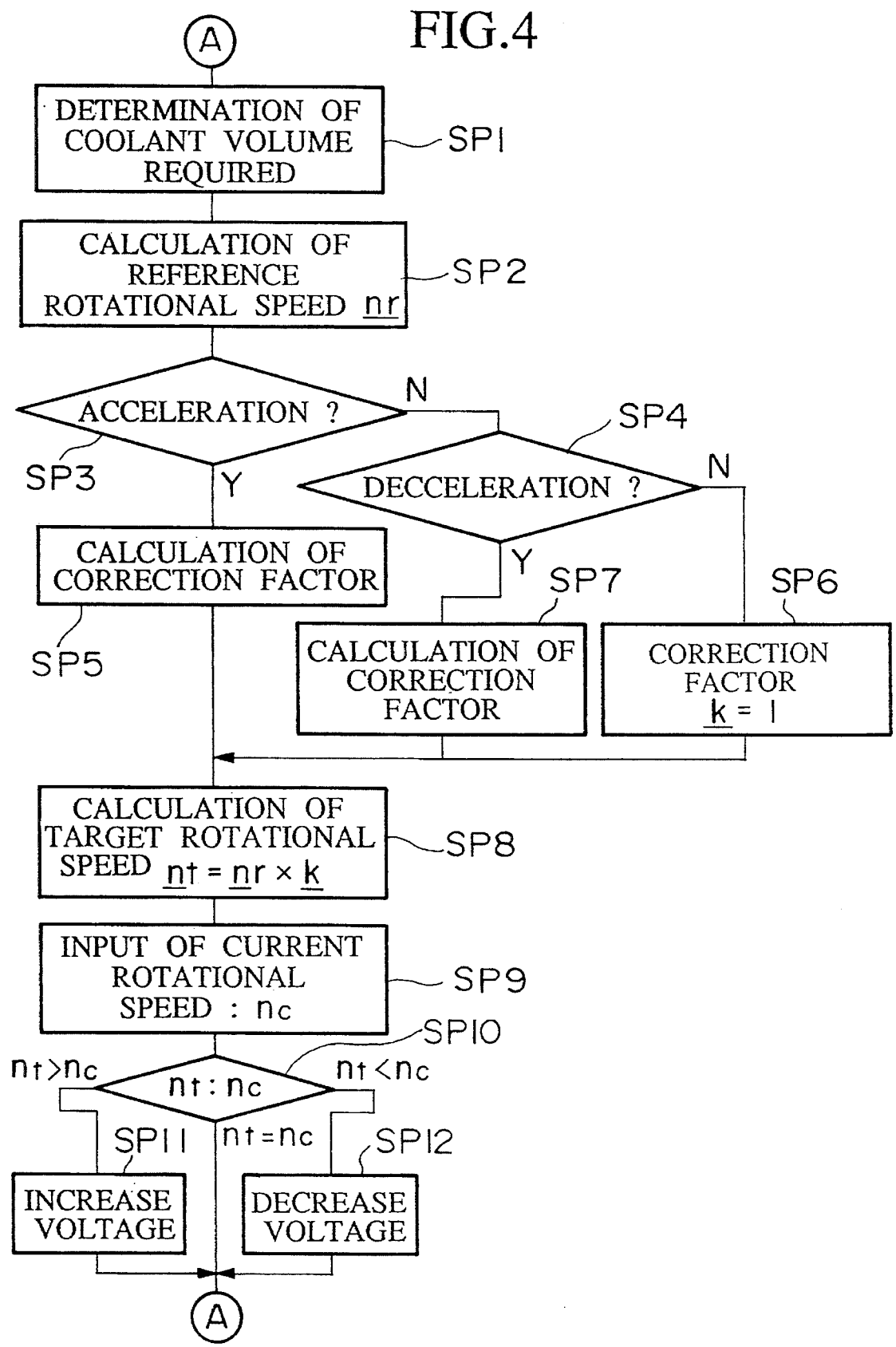
FIG. 4 is a flow chart illustrating the steps of control by the control unit of FIG. 3.

The clutch control unit 17 has an electric circuit as schematically shown in FIG. 3. The electric circuit includes a 1-chip micro computer 7a containing ROM and RAM for performing the control functions of the fluid clutch device. In the circuit, each of the signals B, C, F and H is inputted to the micro computer 7a through a hex-inverter 7b, a 4-bit binary up/down counter with reset 7c, an octal 3-state non-inverting buffer/line driver/line receiver 7d, while the signals E, which are outputted from two solenoids Sa and Sb, are transmitted to the micro computer 7a through hex-inverters 7b, a dual 2-to-4 line decoder/demultiplexer 7e. In addition, the inputted signal G, which is in the form of a switch signal, is transmitted to the micro computer 7a through a conventional charging/discharging circuit 7f, and the inputted signal D is transmitted through an 8-bit A/D converter 7g to the computer 7a. The micro computer 7a performs processing using the above inputted signals and a signal from a clock 7f, and produces signals which are outputted through an octal D-type flip-flop 7h with 3-state, an up/down counter with reset 7c, a 4-bit bistable latch 7g, and a quad 2-input AND gate 7h, whereby a command signal is obtained as a pulse width modulation.

Next, the control steps of the clutch control unit 17 will be explained in detail with reference to the operation of the entire fluid clutch device. The steps SP1–SP12 in the following explanation correspond to those shown in FIG. 4.

Upon starting the engine, the clutch control unit 17 receives input signals as follows: a signal B from the rotameter 21 indicating the rotational speed of the output shaft 3 (i.e., the compressor 3a); a signal C from the engine control unit 18 indicating the engine speed, and a signal D indicating the degree of opening of the throttle valve assembly; and from the air conditioner control unit 20, a signal G indicating the on/off requirement for the compressor 3a and a signal H indicating the volume of the coolant required.

Figure 5:
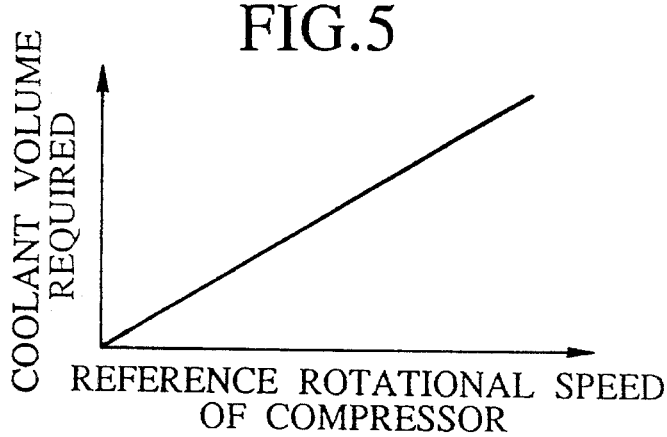
FIG. 5 is a graph showing a relationship between the coolant volume and the revolution count for a compressor.

When an on-signal G for the compressor 3a is outputted from the air control unit 20, the clutch control unit 17 determines the required volume of coolant from a signal H generated by the air conditioner control unit 20 (step SP1), from which the clutch control unit 17 determines a reference rotational speed nr of the compressor 3a (step SP2). The relationship between the reference rotational speed of the compressor 3b and the coolant volume required is shown in FIG. 5, which shows that the output coolant volume increases approximately linearly with the rotational speed of the output shaft 3. This relationship is determined by the characteristics of the compressor 3a.

In the meantime, the clutch control unit 17 determines which one of the three motion stages the vehicle is in, i.e., acceleration stage, constant-speed stage, or deceleration stage, based on the output signal E (gear position) and the signal F (vehicle speed) generated by the transmission control unit 19, and the signal C (engine speed) and the signal D (throttle valve opening) generated by the engine control unit 18. These steps correspond to SP3, SP4.

Figure 6:
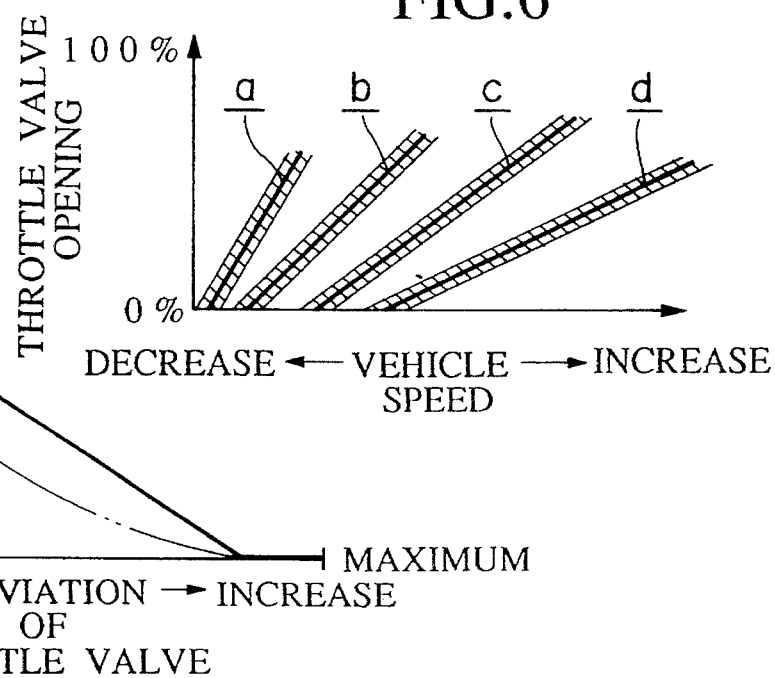
FIG. 6 is a graph showing a relationship between the throttle valve opening and the vehicle speed in the constant speed stage.
Figure 7:
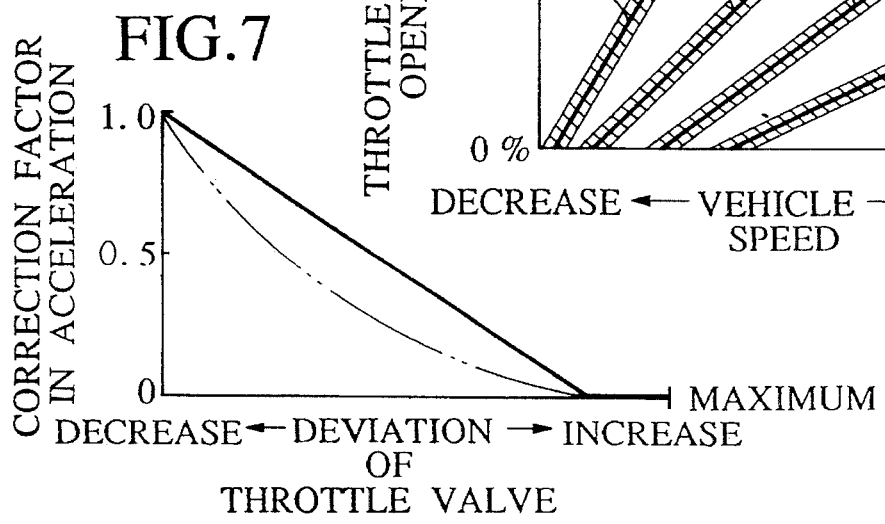
FIG. 7 is a graph showing a relationship between the acceleration stage correction factor and the degree of throttle valve opening.

An example of the determination process will be explained with reference to FIG. 6. The relationship between the vehicle speed and the throttle valve opening when the vehicle is moving on a flat terrain is shown in FIG. 6, in which the various positions of the first, second, third and fourth gears are shown by curves a, b, c, and d, respectively. The shaded areas represent the allowances made for the variations caused by passenger and goods loading. The clutch control unit 17 determines what motion stage the vehicle is in by comparing the current throttle valve opening (based on signal D generated by the engine control unit 18) with the throttle valve opening obtained from FIG. 6 on the basis of the throttle valve opening to correspond with the actual vehicle speed and the current gear position (based on signals F, E generated by the transmission control unit 19), in accordance with FIG. 6. When the current value of the throttle valve opening is higher than the upper limit shown in FIG. 6, the vehicle is judged to be accelerating. If the comparison result is within the shaded area, the vehicle is judged to be in the constant speed stage, and if the current throttle opening is less than the lower limit, the vehicle is judged to be in the deceleration stage.

It is also possible to correct the relationship between the throttle valve opening and the vehicle speed with the data from height transducers which relate to the degree of sinking of the suspensions. It would mean, for example, that the throttle valve opening is increased for a given vehicle speed when the vehicle is loaded. In such cases, it would be possible to eliminate the uncertainties, and to enable a more precise relationship to be determined. Various combinations of control data can be used to further improve the accuracy and response of control actions.

Depending on the motion stage of the vehicle, the target revolution count of the compressor 3a, obtained from the required volume of the coolant, is then corrected for the improved control of the throttle valve opening.

More specifically, when the vehicle is in the acceleration stage, a correction factor k is applied to the throttle valve opening obtained from FIG. 6. The correction factor k is determined from FIG. 7 which is established by setting k as a function of the deviation of the current throttle opening from the throttle opening determined on the basis of FIG. 6. The value of k is 1.0 when the deviation is minimum, and the value of k is 0 when the deviation is lower than the maximum by a set amount. Between the two extreme values, the magnitude of k is varied linearly with the amount of deviation (step SP5). This linearly varying relationship for correction factor is suitably applied to the clutch control for standard vehicles. It may be modified depending upon the type of the vehicle. For example, in the case of a sports car which requires a quick acceleration, the correction factor may be selected according to the curve indicated by the two-dot and dash line in FIG. 7.

When the vehicle is within the variation range in the constant speed stage, no correction is applied to the current value (step SP6).

Figure 8:
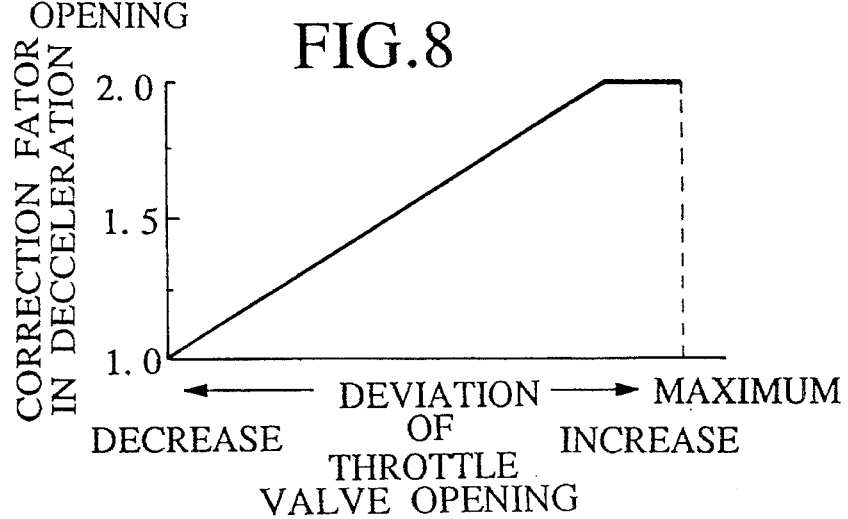
FIG. 8 shows a relationship between the deceleration stage correction factor and the degree of throttle valve opening.

When the vehicle is in the deceleration stage, the correction is according to a relationship shown in FIG. 8. When the deviation is minimum, the correction factor k is 1.0; and the correction factor is 2 when the deviation is less than the maximum value by a set amount. Between the two extreme k values, the magnitude of k is varied linearly with the amount of the deviation (step SP7).

Subsequently, the clutch control unit 17 controls the voltage to be generated by the generator 16 in the following manner.

Designating the current revolution count as nc and the target rotational speed as nt, the target rotational speed nt is corrected by multiplying the reference rotational speed nr obtained from the target coolant volume with k obtained as outlined above (step SP8). Next, the current rotational speed nc is determined from the output reading of the rotameter 21 (step SP9).

Next, the current rotational speed nc is compared with the target rotational speed nt (step SP10). The clutch control unit 17 outputs a signal A in accordance with the requirement in step SP10 so as to control the voltage generated by the generator 16. Specifically, if nt>nc, the generator 16 generates a higher voltage than the current voltage so as to increase the viscosity of the electroviscous fluid (step SP11), and if nt<nc, the generator 16 generates a lower voltage than the current voltage so as to decrease the viscosity (step SP12). By repeating the above process of adjustments, the current rotational speed is made to equal the target rotational speed. In practice, the difference between the target rotational speed nt and the current rotational speed nc is maintained within an allowable deviation range. By constantly applying the above steps of correction, the current rotational speed is made to equal the target rotational speed, regardless of the engine speed.

Accordingly, when the vehicle is in the acceleration stage, the correction value k adjusts the rotational speed of the compressor 3a such that nt is less than that in the constant speed stage (i.e., the transmission of power within the fluid clutch is made smaller than that in the constant speed stage). This results in a smaller control voltage being applied to the electroviscous fluid, and the viscosity of the electroviscous fluid becomes smaller than that in the constant speed stage. Therefore, the transmission of power from the engine to the compressor 3a is less than that in the constant speed stage.

It follows that the power loss to the compressor 3a is decreased, and more engine power becomes available to drive the vehicle itself. Therefore, even if the air conditioner is being operated during the acceleration stage, the acceleration is not robbed of the power and smooth acceleration is obtained. Fuel consumption is also improved.

Moreover, the correction factors are determined in relation to the degree of deviation of the throttle valve opening. That is, when large deviation exist between the current and the target acceleration, the correction factor k is made small to control the control voltage so as to transmit less power to the compressor 3a. When a smaller deviation exists, the correction factor is correspondingly set larger to control the voltage so that more power can be transmitted to the compressor 3a. It follows therefore that the transmission of power from the engine to the compressor 3a can be adjusted infinitely in accordance with the degree of acceleration needed.

On the other hand, when the vehicle is in the deceleration stage, the k values are selected so as to increase the target rotational speed nt for the compressor 3a (i.e., the transmission of power within the device is made larger than that in the constant speed stage), by increasing the control voltage applied to the electroviscous fluid compared with that in the constant speed stage. It follows that the power coupling between the engine and the compressor 3a becomes larger compared with that in the constant speed range, and the engine resistance becomes larger in accordance with the deceleration, thus resulting in improved engine-braking effect, as well as compensating for the decreased coolant volume during the acceleration stage. Furthermore, the motion energy of the moving vehicle can be recovered as a driving power for the compressor 3a.

Figure 9:
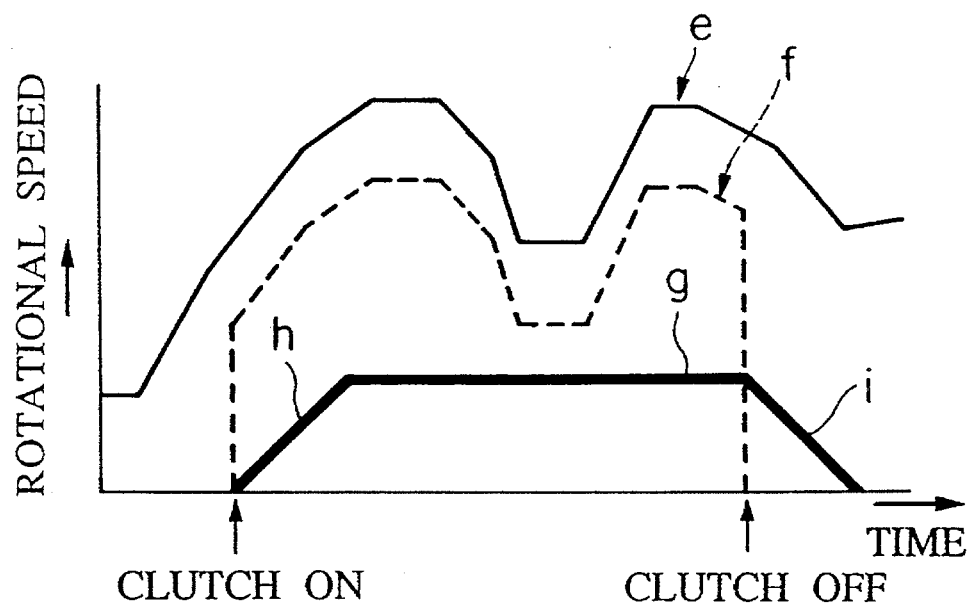
FIG. 9 is an illustration of a relationship between the revolution count of an accessory equipment being operated and the operating time of the accessory equipment to compare the performance of the present fluid clutch device with the conventional fluid clutch device.

Further, because the control voltage is regulated independent of the engine speed, so as to maintain the condition of the current rotational speed nc to be equal to the target rotational speed nt of the compressor 3a the effect of the engine speed variation is eliminated. As shown in FIG. 9, in the conventional system, the compressor rotational speed (curve f) varied with the engine speed (curve e). In contrast, the compressor 3a operated by the fluid clutch device of the present invention is made to rotate at the target rotational speed (curve g), thereby eliminating the wasteful discharge of unneeded coolant and other wasteful mechanical loss of the compressor 3a. The curve g during the actual operation varies with the variation in the required volume of the coolant, but for simplicity, it is shown at a constant rotational speed. The driving power of the engine is transmitted fully effectively to the vehicle. The effect is particularly noticeable during the high speed operation of the engine.

Moreover, since the electroviscous fluid enables transmission of power from the casing 2 to the output shaft 3 immediately upon voltage application, there is no delay in the operation of accessory equipment.

In the foregoing, the relationship between the deviation of the throttle valve opening and the correction factor k is determined by the engine output power, vehicle weight and other characteristics of the vehicle.

Next, the control steps of the clutch control unit 17 when an on/off signal G is generated from an air conditioner control unit 20 will be explained. As described above, when an on-signal G is generated from the air conditioner control unit 20, the clutch control unit 17 determines whether the vehicle is in one of the three stages, acceleration/constant speed/deceleration, and depending on the stage, a control signal A is generated to control the operation of the compressor 3a by outputting appropriate control voltage to be applied to the electroviscous fluid. However, when the signal G is changed from "off" to "on", i.e., at the start of the operation of the compressor 3a, the control voltage is applied slowly to the fluid material regardless of the motion stage of the vehicle. The voltage is applied so as to increase it gradually at a predetermined rate so that the transmission of power from the casing 2 to the output shaft 3 occurs slowly so that the rotational speed of the compressor 3a rises slowly to a target speed as shown by curve h in FIG. 9.

Similarly, when the signal G changes from "on" to "off, the voltage is not diminished suddenly regardless of the motion stage of the vehicle. The voltage is decreased so as to decrease it gradually at a predetermined rate so that the transmission of power from the casing 2 to the output shaft 3 occurs slowly so that the rotational speed of the compressor 3a decreases slowly and stops as shown by curve i in FIG. 9.

Accordingly, the transmission of power from the engine to the compressor 3a is not made suddenly, thereby eliminating noises and mechanical shocks to give unpleasant sensations to the occupant of the vehicle.

In this embodiment, when the engine revolution is so low that the target rotational speed of the compressor 3a cannot be attained, the clutch control unit 17 suppresses the control activity of the generator 16 to increase the control voltage to be applied on the electroviscous fluid, and regulates the voltage so as to apply the minimum voltage necessary to rotate the compressor 3a at the existing engine speed, thereby conserving the electrical power consumption.

Figure 10:
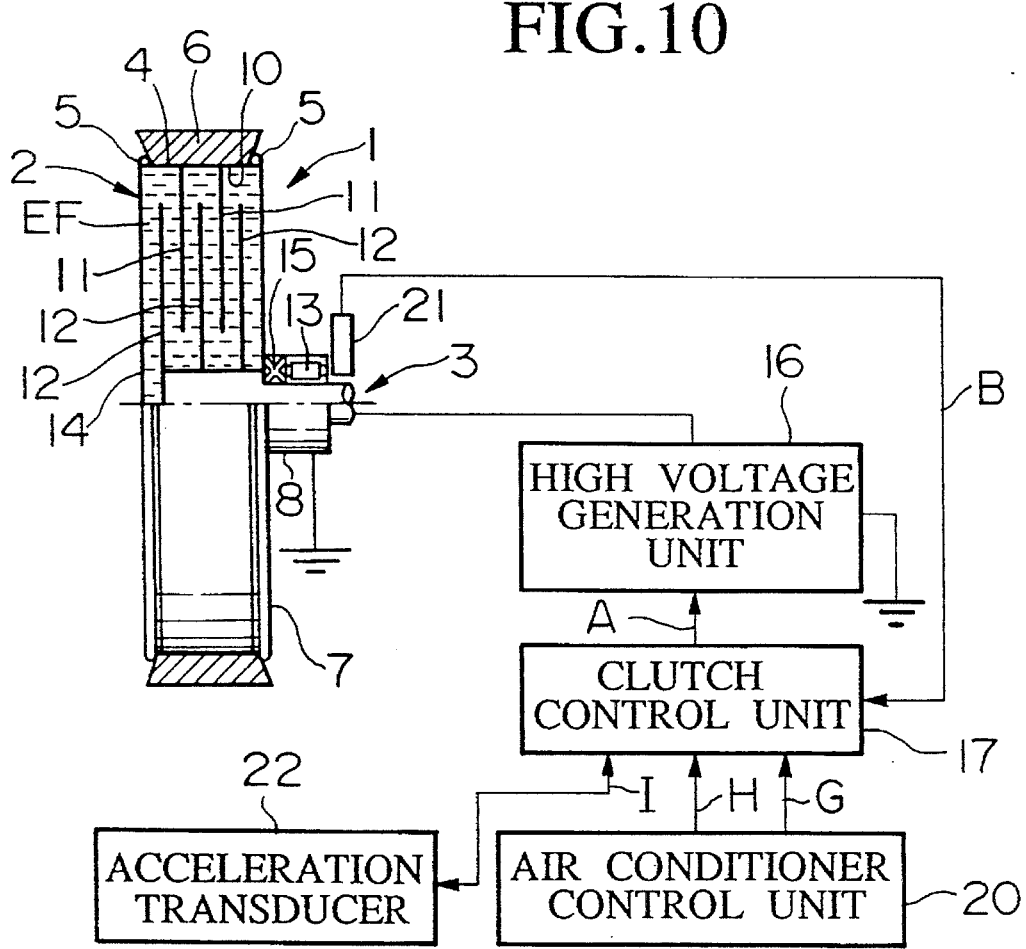
FIG. 10 is a view similar to FIG. 2, but showing a modification of the fluid clutch device of FIG. 1.

In the above embodiment, the determination of the motion stage of the vehicle was made in accordance with the output signals C, D from the engine control unit 18, and signals E, F from the transmission control unit 19, so as to compare the throttle valve opening in the constant speed stage with the current throttle valve opening. However, as shown in FIG. 10, the same purpose could be served by providing an acceleration transducer 22 which indicates acceleration/deceleration in the direction of vehicle motion, and using the output signal I to determine the motion stage of the vehicle.

Figure 11:
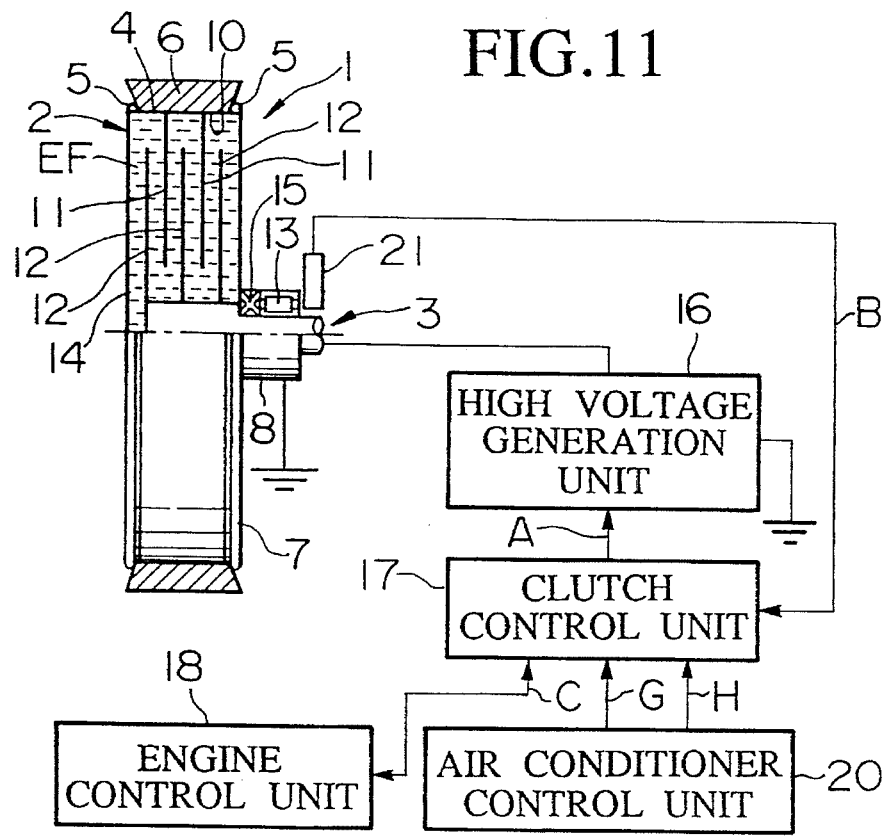
FIG. 11 is a view similar to FIG. 10, but showing another modification of the fluid clutch device of FIG. 1.
Figure 12:
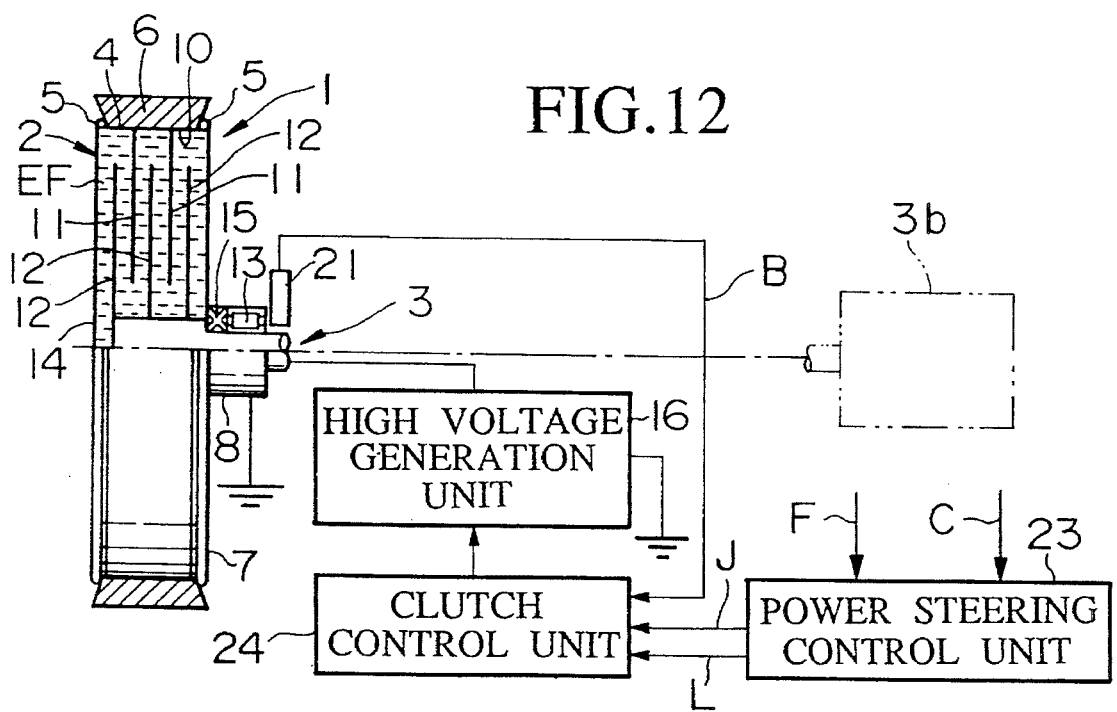
FIG. 12 is a view similar to FIG. 2, but showing a fluid clutch device in accordance with a second embodiment of the invention.

FIG. 11 depicts another modified clutch device which is basically similar in construction to that shown in FIG. 1. In this modification, the rotameter 21 to measure the rotational speed of the output shaft 3 (i.e., the rotational speed of the compressor 3a), the air conditioner control unit 20 and the engine control unit 18 are connected to the clutch control unit 17 to provide input signals to the unit 17.

The engine control unit 18 outputs a signal C indicating the engine speed. It is also permissible to directly connect the clutch control unit 17 to an engine revolution counter.

The air conditioner control unit 20 outputs a signal G to control the on-off action of the compressor 3a in accordance with the difference between a desired temperature and the current temperature, and a signal H indicating the volume of coolant required.

The control steps of the clutch control unit 17 in this modification will be explained.

Upon starting the engine, the clutch control unit 17 receives input signals as follows: a signal B from the rotameter 21 indicating the rotational speed for the output shaft 3 (i.e., the compressor 3a); a signal C indicating the engine speed from the engine control unit 18; and from the air conditioner control unit 20, signals G and H, respectively indicating the on/off requirement for the compressor 3b and the volume of coolant required.

When an on-signal H for the compressor 3a is outputted from the air control unit 20, the clutch control unit 17 determines the volume of coolant required from a signal H generated by the air conditioner control unit 20, from which the clutch control unit 17 determines the target rotational speed for the compressor 3a.

The clutch control unit 17 determines the current rotational speed of the rotameter 21 from the signal B, and by comparing the current rotational speed with the target rotational speed of the compressor 3a determined by the target coolant volume, generates a suitable control signal A, and commands the generator 16 to generate a control voltage of an appropriate magnitude. Specifically, when the current rotational speed is less than the target rotational speed, a slightly higher voltage value (than the current value) is generated to increase the viscosity of the electroviscous fluid, and when the current rotational speed is higher than the target rotational speed, a slightly lower voltage value is generated. By repeating such steps of comparison/adjustments process, the current rotational speed and the target rotational speed are made to match. In practice, the difference between the current value and the target value is maintained within an allowable deviation range. Throughout the changing vehicle speeds during the operation of the vehicle, the current and target values are adjusted to match each other by repeating the above process of control.

As described above, it is possible to control the control voltage applied on the electroviscous fluid so as to match the current rotational speed of the compressor 3a with the target rotational speed, independently of the engine speed. In other words, the control voltage applied on the electroviscous fluid is varied so as to match the current rotational speed of the compressor 3a with the required rotational speed which would be appropriate to the vehicle speed. The driving power is transmitted to the compressor 3a by coupling the outer plates 11 (casing 2) with the inner plates 12 (output shaft 3) via the electroviscous fluid. Accordingly, the electroviscous fluid changes its viscosity and the degree of coupling so as to transmit the required driving force to the compressor 3a. Thus a driving force in excess of a requirement cannot be transmitted to the compressor 3a.

Therefore, irrespective of the engine speed, the compressor 3a always receives only the necessary magnitude of turning force, thus eliminating unnecessary use of the motive power for the vehicle.

In the above embodiment, when the engine speed is so low that the target rotational speed of the compressor 3a cannot be attained, the clutch control unit 17 suppresses the control activity of the generator 16 to increase the control voltage to be applied on the electroviscous fluid, and regulates the voltage so as to apply the minimum voltage necessary to rotate the compressor 3a at the existing engine speed, thereby conserving the electrical power consumption.

Next, a second embodiment of the clutch device of the present invention for driving accessory equipment will be presented. This embodiment relates to an application of the fluid clutch device to an oil pump for power steering (referred to as the oil pump hereinbelow). The explanation will center around the differences between the first and second embodiments, and the components common to both embodiments are given the same reference numbers and their explanations are omitted.

A known power steering control unit 23 for controlling a power steering mechanism (not shown) and the rotameter 21 for detecting the rotational speed of the output shaft 3, i.e., an oil pump 3b, are connected to a clutch control unit 24.

The power steering control unit 23 is provided for the purpose of controlling the function of the power-assisted steering in accordance with the vehicle speed. A vehicle speed signal F is inputted to the power steering control unit 23 either from a known vehicle speed transducer which determines the vehicle speed from the speed of revolution of the drive system in the transmission, or from the transmission control unit used in the previous embodiment. In addition, an engine speed signal C is inputted to the power steering control unit 23 either from a known engine speed transducer or the engine control unit mentioned in the previous embodiment. The power steering control unit 23 outputs a target pump rotational speed signal J for the oil pump 3b and an engine speed signal L to the clutch control unit 24 so as to generate suitable steering-assist power appropriate to the vehicle speed by rotating the oil pump 3b at a suitable speed (i.e., a high revolution when the vehicle speed is low, and a low revolution when the vehicle speed is high). In this case, the signal C for the engine speed may be directly forwarded to the clutch control unit 24.

Next, the control steps of the clutch control unit 24 in the second embodiment will be explained with reference to the whole operation of the fluid clutch device.

When the engine is started, a signal B indicating the current rotational speed of the output shaft 3 (i.e. the oil pump 3b) is generated from the rotameter 21, and a signal J indicating the target rotational speed for the oil pump 3b in accordance with the vehicle speed, and an engine speed signal L are generated from the power steering control unit 23 and inputted into the clutch control unit 24.

The clutch control unit 24 then determines the target rotational speed for the oil pump 3b from the signal J generated by the power steering control unit 23, and by comparing the current rotational speed generated by the rotameter 21 with the target rotational speed, generates a control signal A accordingly, and commands the generator 16 to generate a control voltage of an appropriate magnitude.

Specifically, when the current rotational speed is less than the target rotational speed, a slightly higher voltage value (than the current value) is generated to increase the viscosity of the electroviscous fluid, and when the current rotational speed is higher than the target rotational speed, a slightly lower voltage value is generated. Processing steps of comparison/adjustments are repeated until the current rotational speed and the target rotational speed are matched. In practice, the difference between the current value and the target value is maintained within an allowable deviation range. Throughout the changing vehicle speeds of the operation of the vehicle, the current and target values are adjusted to match each other by repeating the above control process.

As described above, it is possible to control the applied voltage on the electroviscous fluid so as to match the current rotational speed of the oil pump 3b with the target rotational speed, independently of the engine speed. In other words, the control voltage applied to the electroviscous fluid is controlled so as to match the current rotational speed of the oil pump 3a with the target rotational speed appropriate to the vehicle speed. The voltage control regulates the degree of coupling of the outer plates 11 (casing 2) and the inner plates 12 (output shaft 3) by changing the viscosity of the electroviscous fluid therebetween, thereby controlling the driving force delivered to the oil pump 3b so that only the required magnitude of driving force is delivered to the oil pump 3b. Thus a driving force in excess of a requirement cannot be transmitted to the oil pump 3a. It follows that, irrespective of the rotational speed of the engine, the oil pump 3a always receives only the necessary magnitude of driving force, thus eliminating unnecessary discharge of oil or mechanical loss induced by unnecessary operation of the oil pump 3b. Therefore, the engine power is fully effectively used for moving the vehicle, and this effect is particularly noticeable during the high speed operation of the engine.

Further, the rotational speed of the oil pump 3b, i.e. the assist-power, can be varied continually or in discrete steps.

Further, as is the case with the previous embodiment, because it is possible to affect the viscosity immediately by the application of control voltage on the electroviscous fluid, there is no delay in the response time of the oil pump 3b. In addition, the clutch control unit 24 is programmed such that when the engine speed is so low, according to the signal from the power steering control unit 23, that the target rotational speed of the oil pump 3b cannot be attained, the power consumption is minimized by suppressing the control activity of the generator 16 to increase the voltage (to be applied) on the electroviscous fluid, and regulating the voltage so as to apply the minimum voltage necessary to rotate the oil pump 3b at the existing engine speed.

When adapting a power steering mechanism which is to supply a constant assist power, in place of the vehicle-speed dependent system presented above, it is necessary that the current rotational speed of the oil pump 3b is made to be the same as a predetermined rotational speed, and to apply a control voltage to the electroviscous fluid to maintain such a condition. In such a case, the power steering control unit 23 would not be required, and the engine speed signal can be inputted directly to the clutch control unit 24 to enable power steering control when the engine speed is low. It is obvious that this approach can also be adapted to rotameter-driven power steering control system.

Additionally, when starting an engine, to avoid the shock of a sudden activation of the oil pump 3b by the application of voltage from the generator 16 to the electroviscous fluid, it is also permissible to gradually increase the control voltage applied on the electroviscous fluid, thus coupling the first member with the second member to slowly increase the revolution count of the oil pump 3b to the target value of the revolution count.

Obviously, many modifications and variations of the present invention are possible in the light of the above teachings. For example, in the embodiments presented above, the drive member and the driven member of the fluid clutch device are constructed by the disc-shaped plates 11 and 12 fixed to the casing 2 and the output shaft 3. However, cylindrical members of different diameters may be arranged coaxially and alternately so as to define the drive member and the driven member. Furthermore, the clutch device of the invention is also applicable to drive accessory equipment in other motive power applications requiring both high and low driving powers.

Finally, the present application claims priorities of Japanese Patent Applications Nos. 4-258650 and 4-258651, both filed on Sep. 28, 1992, which are herein incorporated by reference.

What is claimed is:

1. A fluid clutch device in a vehicle having a vehicular engine and an accessory equipment, with the fluid clutch device controlling transmission of motive power of the vehicular engine to the accessory equipment, said clutch device comprising:

(a) first and second members arranged for relative rotation about a common axis, said first member being constructed to be operated by said vehicular engine while said second member is constructed to operate said accessory equipment;

(b) a hermetically sealed clutch casing for accommodating said first and second members therein, said clutch casing containing an electroviscous fluid therein;

(c) a source of high voltage potential provided for applying a voltage to said electroviscous fluid to change viscosity of the electroviscous fluid to vary coupling force between said first and second members;

(d) means for generating a signal regarding driving of the accessory equipment; and (e) a clutch control unit electrically connected to said source of high voltage potential and said accessory signal-generating means for regulating the voltage applied to said electroviscous fluid based on said accessory signal generated from said accessory signal-generating means to vary a driving power to be transmitted to said accessory equipment and wherein said accessory signal-generating means includes means for generating a signal representative of an actual driving speed of the accessory equipment and means for generating a signal representative of a target driving speed of the accessory equipment, and wherein said clutch control unit is constructed to:

determine whether the vehicle is in an acceleration stage, constant-speed stage or deceleration stage using signals from a vehicle drive signal-generating means, said vehicle drive signal-generating means including an engine motion signal-generating means and a transmission state signal-generating means;

obtain a reference driving speed of the accessory equipment based on the accessory signal generated from said accessory signal-generating means;

obtain a target driving speed of the accessory equipment by correcting said reference driving speed according to vehicle stage; and regulate the voltage to be applied to the electroviscous fluid so that the actual driving speed obtained from said actual driving speed signal-generating means matches the target driving speed obtained from said target driving speed signal-generating means.

2. A fluid clutch device as defined in claim 1, wherein said control unit is constructed to increase the voltage to be applied to the electroviscous fluid gradually at activation of the accessory equipment and decrease the same gradually at deactivation of the accessory equipment.

3. A fluid clutch device as defined in claim 1, wherein said accessory equipment is a compressor for a vehicular air conditioner, said actual driving signal-generating means including sensing means for sensing an actual rotational speed of said compressor, said target driving speed signal-generating means including an air conditioner control unit for generating a signal representative of a target rotational speed of said compressor, and wherein said engine motion signal-generating means of said vehicle drive signal-generating means includes an engine control unit while said transmission signal-generating means includes a transmission control unit.

4. A fluid clutch device of claim 1, wherein said accessory equipment is an oil pump for a vehicular power steering mechanism.

5. A fluid clutch device of claim 1, wherein said accessory equipment is a compressor for a vehicular air conditioner.

6. A fluid clutch device in a vehicle having a vehicular engine and an accessary equipment, with the fluid clutch device controlling transmission of motive power of the vehicular engine to the accessory equipment, said clutch device comprising:

(a) first and second members arranged for relative rotation about a common axis, said first member being constructed to be operated by said vehicular engine while said second member is constructed to operate said accessory equipment;

(b) a hermetically sealed clutch casing for accommodating said first and second members therein, said clutch casing containing an electroviscous fluid therein;

(c) a source of high voltage potential provided for applying a voltage to said electroviscous fluid to change viscosity of the electroviscous fluid to vary coupling force between said first and second members;

(d) means for determining whether the vehicle is in a constant-speed stage, and for determining whether the vehicle is in at least one of an accelerating stage and a decelerating stage, said means for determining generating a first signal;

(e) means for generating a second signal indicating whether driving of the accessory equipment is needed; and (f) a clutch control unit electrically connected to said source of high voltage potential, said clutch control unit receiving said first and second signals and regulating the voltage applied to said electroviscous fluid in response to said first and second signals to vary a driving power to be transmitted to said accessory equipment.

7. A fluid clutch device as defined in claim 6, wherein said control unit is constructed to increase the voltage to be applied to the electroviscous fluid gradually at activation of the accessory equipment and decrease the same gradually at deactivation of the accessory equipment.

8. A fluid clutch device as defined in claim 6, wherein said clutch control unit is constructed to regulate the voltage applied to the electroviscous fluid so as to transmit only a required magnitude of the diving power to the accessory equipment.

9. A fluid clutch device as defined in claim 8, wherein said accessory signal-generating means comprises means for generating a signal representative of an actual driving speed of the accessory equipment and means for generating a signal representative of a target driving speed of the accessory equipment, said clutch control unit being constructed to regulate the voltage applied to the electroviscous fluid so that the actual driving speed of the accessory equipment obtained from the actual driving speed signal-generating means matches the target driving speed obtained from the target driving speed signal-generating means.

10. A fluid clutch device as defined in claim 9, wherein said accessory equipment is an oil pump for a vehicular power steering mechanism, said actual driving speed signal-generating means including sensing means for sensing an actual rotational speed of said oil pump, said target driving speed signal-generating means including a power steering control unit for generating a signal representative of a target rotational speed of the oil pump.

11. A fluid clutch device as defined in claim 9, wherein said accessory equipment is a compressor for a vehicular air conditioner, said actual driving speed signal-generating means including sensing means for sensing an actual rotational speed of said compressor, said target driving speed signal-generating means including an air conditioner control unit for generating a signal representative of a target rotational speed of the compressor.

12. A fluid clutch device in a vehicle having a vehicular engine and an accessary equipment, with the fluid clutch device controlling transmission of motive power of the vehicular engine to the accessory equipment, said clutch device comprising:

(a) first and second members arranged for relative rotation about a common axis, said first member being constructed to be operated by said vehicular engine while said second member is constructed to operate said accessory equipment;

(b) a hermetically sealed clutch casing for accommodating said first and second members therein, said clutch casing containing an electroviscous fluid therein;

(c) a source of high voltage potential provided for applying a voltage to said electroviscous fluid to change viscosity of the electroviscous fluid to vary coupling force between said first and second members;

(d) means for generating a signal regarding driving of the accessory equipment; and (e) a clutch control unit electrically connected to said source of high voltage potential and said accessory signal-generating means for regulating the voltage applied to said electroviscous fluid based on said accessory signal generated from said accessory signal-generating means to vary a driving power to be transmitted to said accessory equipment;

wherein said clutch control unit is constructed so as to lessen the voltage to be applied to the electroviscous fluid when the vehicle is in an acceleration stage, whereby the transmission of the driving power to the accessory equipment is reduced in the acceleration stage of the vehicle.

13. A fluid clutch device in a vehicle having a vehicular engine and an accessary equipment, with the fluid clutch device controlling transmission of motive power of the vehicular engine to the accessory equipment, said clutch device comprising:

(a) first and second members arranged for relative rotation about a common axis, said first member being constructed to be operated by said vehicular engine while said second member is constructed to operate said accessory equipment;

(b) a hermetically sealed clutch casing for accommodating said first and second members therein, said clutch casing containing an electroviscous fluid therein;

(c) a source of high voltage potential provided for applying a voltage to said electroviscous fluid to change viscosity of the electroviscous fluid to vary coupling force between said first and second members;

(d) means for generating a signal regarding driving of the accessory equipment; and (e) a clutch control unit electrically connected to said source of high voltage potential and said accessory signal-generating means for regulating the voltage applied to said electroviscous fluid based on said accessory signal generated from said accessory signal-generating means to vary a driving power to be transmitted to said accessory equipment;

wherein said clutch control unit is constructed so as to increase the voltage to be applied to the electroviscous fluid when the vehicle is in a deceleration stage, whereby the transmission of the driving power to the accessory equipment is increased in the deceleration stage.

\* \* \* \* \*

UNITED STATES PATENT AND TRADEMARK OFFICE
CERTIFICATE OF CORRECTION

PATENT NO. : 5,469,947
DATED : November 28, 1995
INVENTOR(S) : Hidenobu ANZAI, et al.

It is certified that error appears in the above-indentified patent and that said Letters Patent is hereby corrected as shown below:

On the title page, Item [30], the Foreign Application Priority Data should read:

--Sep. 28, 1992  [JP]  Japan...............4-258651

Sep. 28, 1992  [JP]  Japan...............4-258650--

Signed and Sealed this

Second Day of April, 1996

Attest:

BRUCE LEHMAN

*Attesting Officer*        *Commissioner of Patents and Trademarks*